United States Patent [19]

Wasserman et al.

[11] 4,125,754
[45] Nov. 14, 1978

[54] INSTALLATION FOR SURFACING USING PLASMA-ARC WELDING

[76] Inventors: René Wasserman, Domaine de Belair, 1111 Echichens, Switzerland; Joseph Quaas, 5 Marion Pl., Island Park, N.Y. 11558; Jean-Claude Chalard, Ch. Rosemont 9, 1024 Ecublens, Switzerland; Léon Noel, Le Parc de Gallion, 78220 Viroflay, France; Hans-Théo Steine, Ch. du Mont Blanc 5, 1023 Crissier, Switzerland

[21] Appl. No.: 758,920

[22] Filed: Jan. 13, 1977

[30] Foreign Application Priority Data

Jan. 15, 1976 [CH] Switzerland ............................. 444/76

[51] Int. Cl.² ............................................... B23K 9/00
[52] U.S. Cl. ................................................ 219/121 P
[58] Field of Search .................. 219/76, 121 P, 137 R

[56] References Cited

U.S. PATENT DOCUMENTS

| | | | |
|---|---|---|---|
| 3,569,661 | 3/1971 | Ebelling et al. | 219/121 P |
| 3,790,742 | 2/1974 | Auer | 219/121 P |
| 3,809,850 | 5/1974 | Saenger | 219/121 P |

FOREIGN PATENT DOCUMENTS

946,262  1/1964  United Kingdom ................. 219/121 P

Primary Examiner—J. V. Truhe
Assistant Examiner—Fred E. Bell
Attorney, Agent, or Firm—Cushman, Darby & Cushman

[57] ABSTRACT

The invention relates to an installation for surfacing by plasma-arc welding including in particular a plasma torch and a control and power supply device for the formation of a transferred arc between the electrode of the torch and the workpiece to be surfaced and of a non-transferred arc between the said electrode and the nozzle of the torch, the control and power supply device comprising a single d.c. source one terminal of which is connected to the electrode of the torch and the other terminal of which is connected, on the one hand, to the workpiece to be surfaced and on the other hand to the nozzle of the torch via a resistance. The plasma torch has at least two cooling systems supplied by a distribution device which is controlled as a function of the cooling water temperature and/or the electrical power consumption of the torch.

13 Claims, 3 Drawing Figures

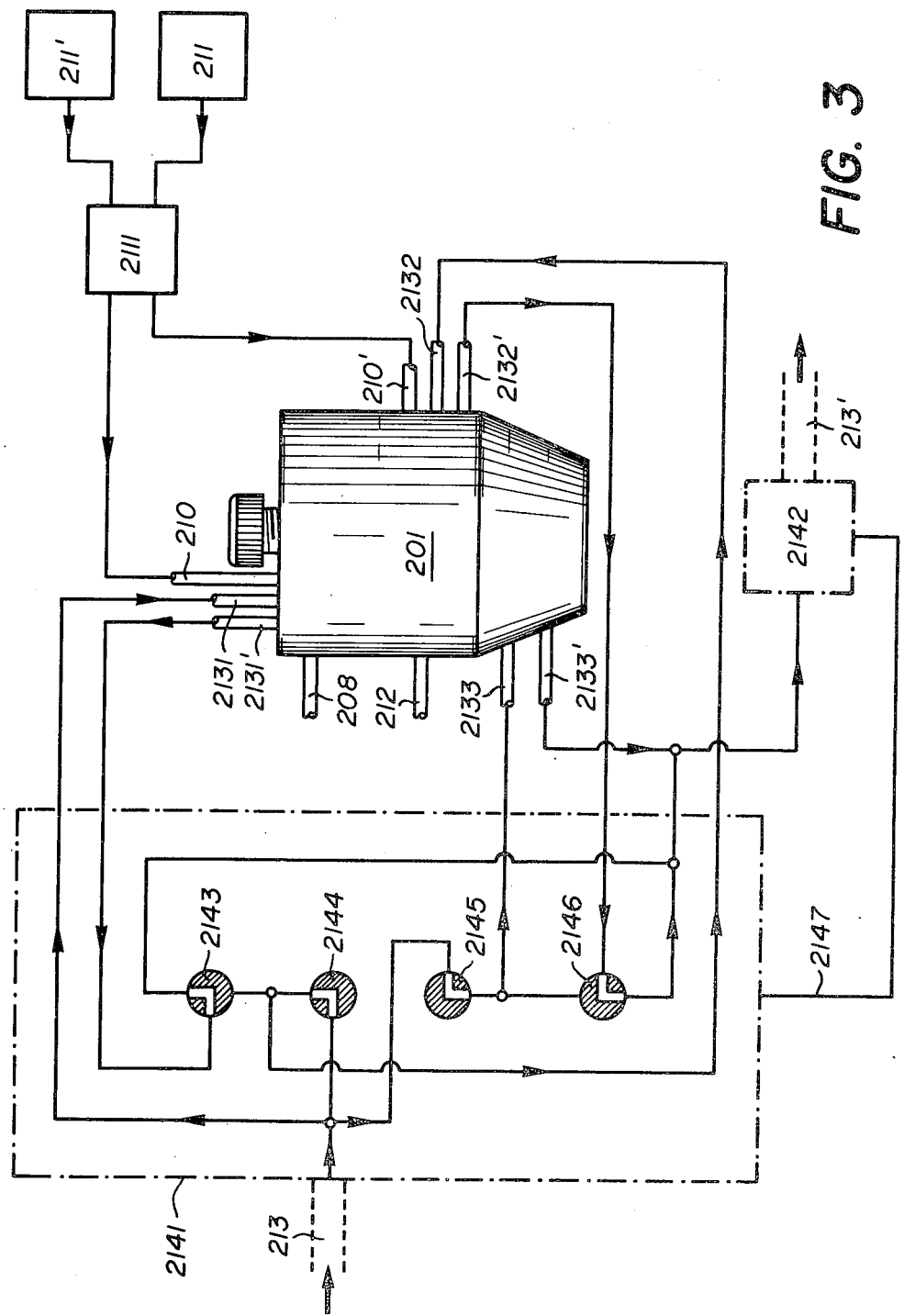

INSTALLATION FOR SURFACING USING PLASMA-ARC WELDING

The present invention relates to a surfacing installation using plasma-arc welding, comprising a plasma torch connected to a source of a plasma forming gas, a protection gas source, and a source of a gas carrying surfacing material in powder form, and a control and power supply device for forming a transferred arc between an electrode in the torch and the workpiece to be recharged and a non-transferred arc between this electrode and a nozzle of the torch.

In such an installation, an arc is first struck between the electrode generally consisting of tungsten an a nozzle of the torch, the arc is then transferred to the workpiece to be surfaced and is restricted to the nozzle zone. The surfacing material is conveyed in powder form by a current of gas, usually argon, to the zone where the arc comes out of the nozzle, is melted and directed in the transferred plasma arc to the workpiece to be surfaced. To form the two above mentioned arcs, conventional devices usually have two d.c. sources, which is an expensive and complex solution.

A first object of the present invention is to provide an installation of the type described in the introduction, in which the control and power supply device is considerably simplified.

To this end, the installation according to the present invention is characterized in that the control and power supply device comprises a single d.c. source one terminal of which is connected to the electrode of the torch and the other terminal of which is connected, on the one hand, to the workpiece to be surfaced and, on the other hand, to the said nozzle of the torch via a resistance.

Various embodiments of such an installation aim at a number of further advantages as far as the operation of the installation is concerned, particularly at the beginning and at the end of a surfacing operation, and at improving and simplifying the control thereof.

Another object of the present invention is to provide an installation having a plasma torch constructed in a particularly advantageous way especially from the maintenance and possibilities of application point of view.

The characteristics and the advantages of the present invention will better appear from the following description of various embodiments given by way of example with reference to the accompanying drawings, in which:

FIG. 3 is a partial diagram illustrating a further embodiment of an installation according to the invention.

Figure 1:
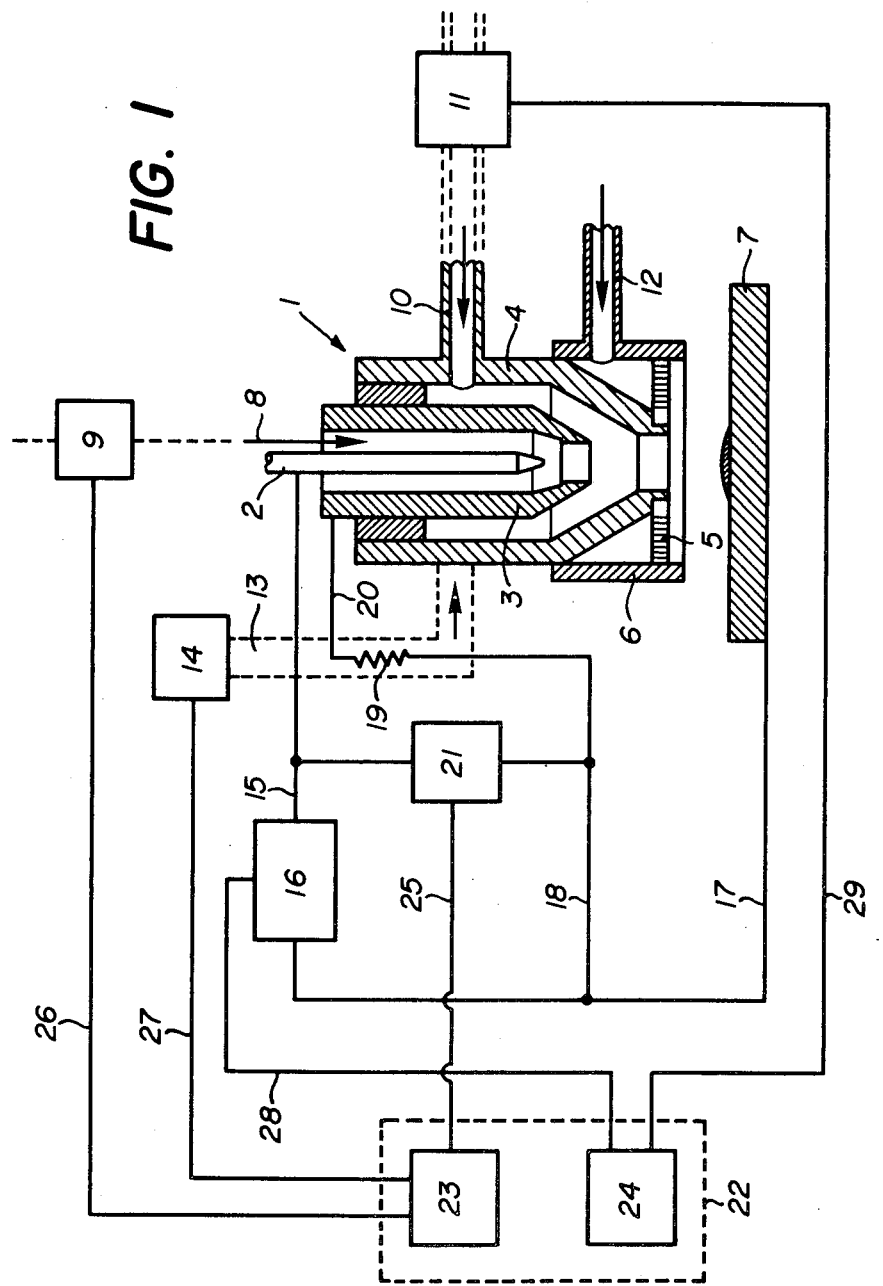
FIG. 1 is a diagram illustrating an embodiment of an installation according to the invention.

FIG. 1 diagrammatically shows the main components of an installation for surfacing by welding, and the connections between the various components.

A plasma torch generally indicated by the reference numeral 1 comprises a tungsten electrode 2 disposed inside a tube 3 whose lower end is conical and forms a main nozzle. The tube 3 is, in turn, surrounded by an outer tube 4 the lower end of which has a conical shape and forms an outer nozzle for the torch. The outer nozzle is surrounded by a perforated annular plate 5 which encloses an annular space formed by the conical portion of the tube 4 and a tube 6 coaxial therewith.

A gas which is called central gas and serves to form the arc plasma between the electrode 2 and the workpiece 7 to be surfaced, is supplied to the space between the electrode 2 and the tube 3. The flow of central gas is schematically indicated by an arrow 8 and a dashed line leading to the arrow 8. In the duct supplying the central gas, there is installed a measuring device 9 adapted to measure the gas flow rate. The torch 1 further comprises an inlet duct 10 for a surfacing material in the form of a powder conveyed by a current of a gas, e.g. argon. The powder is added to the carrier gas by a distributor generally indicated by a block 11, the device 11 comprising in particular a powder container and a device for regulating the amount of powder delivered as described below.

The torch 1 also comprises a duct 12 for the supply of a protection gas, and a duct 13 arranged to convey water for cooling the torch (the cooling circuit is not shown in detail), the duct 13 being generally indicated by dashed lines. The flow rate of the water flowing through the cooling circuit is measured by an apparatus 14 indicated by a respective block in the drawings.

The electrode 2 is electrically connected by way of a lead 15 to the negative terminal of a d.c. source 16. The positive terminal of this current source is connected, on the one hand, to the workpiece to be surfaced, by way of a lead 17, and, on the other hand, to the tube 3 forming the main nozzle, by way of a lead 18, a resistance 19, and a lead 20. The resistance 19 e.g. 3 ohms, formed by a wire in spiral form, is placed directly in the duct 13 which supplies cooling water to the torch 1. A high frequency striking device 21 is connected in parallel to the leads 15 and 18 and is adapted to strike the arc between the electrode 2 and the main nozzle 3.

In the present installation, the non-transferred arc between the electrode 2 and the main nozzle and the transferred arc between the electrode 2 and the workpiece 7 to be surfaced are supplied by means of the current source 16 alone and this owing to the above-mentioned connections and mainly to the presence of the resistance 19. The latter is directly cooled by the cooling water of the torch and, of course, can also be in the form of a variable resistance. The above described supply circuit makes it possible to dispose of a second d.c. source and to establish a required relationship between the current of the non-transferred arc and the current through the transferred arc.

The diagram illustrated in FIG. 1 also includes in the form of a block indicated by a dashed line 22, a control device comprising in particular a safety device 23 for setting the torch 1 in operation and a stop device 24. The safety device 23 is connected, on the one hand, to the striking device 21 by way of a connection 25 and, on the other hand, to the gas flow rate measuring apparatus 9 and the water flow rate measuring apparatus 14, by way of connections 26 and 27, respectively. The stop device 24 is connected to the current source 16 by way of a lead 28 and to a regulating device for the powder distributor 11, by way of a lead 29.

The operation of the installation so far as the above mentioned components 23 and 24 of the control device are concerned, is as follows. When the installation is ready to start operating, the safety device 23 detects, on the one hand, the presence and whether the flow rate of the central gas is sufficient by means of the apparatus 9 and the connection 26, and, on the other hand, the presence and whether the cooling water flow rate is sufficient by means of the measuring apparatus 14 and the connection 27.

Only when the two quantities have attained predetermined values, the device 23 generates an impulse on the lead 25 to prime the striking device 21. The arc therefore is not struck so long as the required conditions for the protection of the torch 1 are not met.

The stop control device 24 controls, by way of the connections 28 and 29, simultaneous reduction of the current supplied by the source 16 and of the surfacing material supplied by the distributor 11. By gradually and simultaneously reducing the current and the amount of powder supplied, the formation of a crater in the workpiece to be surfaced is avoided at the end of the welding operation and a neat, well defined end of the weld layer is obtained.

Regulation of the amount of powder supplied by the device 11 is preferably effected as follows. The distributor 11 comprises an air-tight powder container having an opening which is circular in cross-section and opens out into the carrier gas duct 10. The opening of the powder container is adjustably closed by a slide having a wedge-shaped portion which cooperates with the opening in an intermediate position between the fully opened and fully closed positions.

The actual opening for powder to pass through is then delimited in such an intermediate position by a portion of the circular edge of the opening and the straight edges of the slide forming the wedge which penetrates to a greater or lesser extent into the circular opening. Metering is thus achieved so that the amount of powder varies linearly with respect to the displacement of the closing member. Moreover, in the distributor an adjustable amount of carrier gas is added to the powder container in order to compensate for depression therein as the powder supply decreases. This is achieved by means of an auxiliary duct branching off the duct 10 to supply a portion of gas back to the powder container. A valve makes it possible to adjust the gas pressure in the power container so as to keep it uniform as the amount of powder in the container varies.

The installation described has not only the advantage of providing substantial simplification from the electric current supply point of view, owing to the fact that a single welding current source is used which can be of any type usually employed for welding, but it also ensures simplification and improvement in the performance and the operation of the installation.

Figure 2:
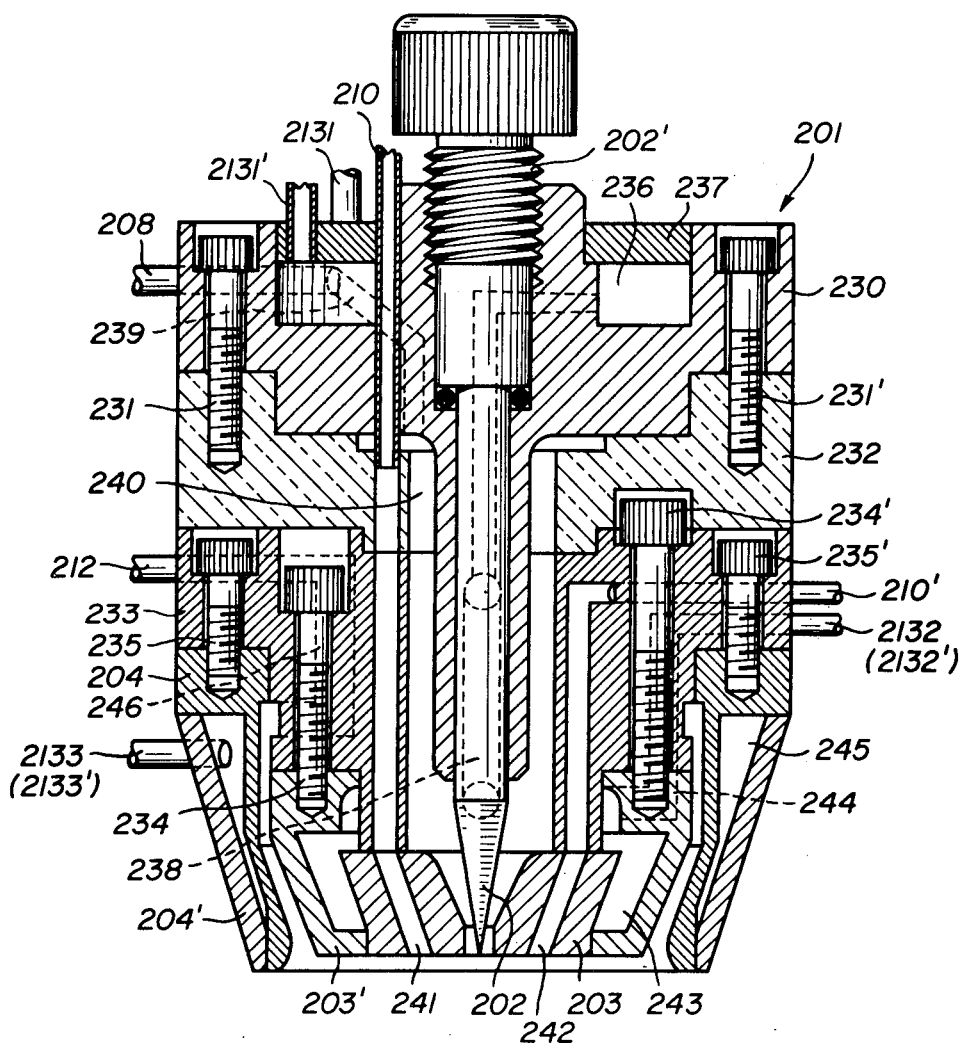
FIG. 2 is an axial cross-sectional view of a plasma torch which can be used in an installation according to the invention.

FIG. 2 shows an axial cross-sectional view illustrating in more detail a torch 201 designed to be used in an installation in accordance with the invention.

The tungsten cathode 202 of the torch is mounted, by means of a screw-threaded portion 202' having a control head, in a metal cathode-holding block 230. The block 230 has in particular and elongated cylindrical portion which surrounds the cathode 202 and ensures centering of it. The cathode can be adjusted in height by rotating the portion 202' which is accessible from the outside. The cathode-holding block is bolted by means of a plurality of screws such as 231, 231' to an intermediate annular member 232 made of an insulating material. The intermediate member is, in turn, fixed by means of screws, not shown in FIG. 2, to a distributing block 233 which is also annular is shape. Finally, the distributing block 233 carries two coaxial assemblies, i.e. an anode assembly 203, 203' which is fixed by means of screws, such as 234, 234', to the block 233, and an outer protection nozzle 204, 204' secured to the block 233 by means of screws, such as 235, 235'.

The five component parts of the torch, i.e. the cathode-holding block, the intermediate insulating member, the distributing block, the anode assembly, and the protection nozzle are thus all assembled by means of screws, this making possible ready assembling and disassembling of the torch.

The cathode-holding block has an annular cooling chamber 236 which is formed by an annular recess in the block and is closed by an annular plate 237. The chamber 236 is a part of a first cooling water circuit for the torch and has an inlet duct 2131 and an outlet duct 2131' both passing through the plate 237. The chamber 236 communicates with a recess 238 in the cathode 202 as diagrammatically indicated by dashed lines in FIG. 2, so as to ensure cooling of the cathode not only from the exterior through the block 230, but also from inside.

The cathode-holding block also has two distribution ducts, i.e. a channel 239 which connects a duct 208 for supplying plasma-forming gas to an annular chamber 240 formed about the cylindrical elongated portion of the cathode-holding block, as will be described below, and a base locating a tube 210 for supplying powder surfacing material. The tube 210 extends into a corresponding base passing through the intermediate piece 232.

The annular members 232 and 233 are superimposed and have central coaxial bases which form the said annular chamber 240 around the elongated guide part of the cathode-holding block. The chamber 240 extends all around the tip of the cathode by way of a funnel-shaped space formed in the anode part 203.

The part 203 has at least two channels such as 241, 242 which are connected, by way of respective contiguous bores in the distribution block 233, respectively with the surfacing material inlet 210 on the one hand and with a second surfacing material inlet 210' in the distribution block on the other hand, as indicated in FIG. 2.

Moreover, the anode part 203 forms, together with a second external coaxial part 203' and a cylindrical end of the distribution block 233, an annular chamber 243 designed to be connected with the water cooling device of the torch by way of the inlet duct 2132 and the outlet duct 2132'. Only one of these ducts is schematically shown in FIG. 2 together with its connection channel 244 extending through the distribution block 233 and part 203.

The protection nozzle surrounding the lower end of the torch comprises two annular coaxial parts 204, 204' which delimit therebetween an annular chamber 245 through which cooling water supplied by an inlet duct 2133 can flow, the water being discharged through an outlet duct 2133', only one of these ducts being shown in FIG. 2.

An annular space is also formed between the inner surface of the nozzle 204 and the outer surface of the part 203' and the lower part of the block 233. Such a space communicates, by way of a duct 246 schematically indicated by dashed lines in the distribution block, with an inlet duct 212 for protection gas used during welding.

The torch thus formed has not only an extremely simple construction from the maintenance view point thanks to the fact that the component parts are assembled together by means of screws and to self-centering of the cathode which is adjustable from the exterior, but it is also liable to find very interesting possibilities of application.

In particular, owing to the cooled protection nozzle the torch makes it possible to work at very high temperature, e.g. for surfacing inside workpieces preheated to high temperature.

Moreover, the use of distinct ducts for supplying the surfacing material or materials makes is possible to realize complex coatings, e.g. by forming limited zones of different compositions from the rest of the coating.

FIG. 3 is a partial diagram showing an installation comprising a torch 201, as in FIG. 2 with the torch connections being schematically indicated by the same reference numerals as in FIG. 2. FIG. 3 illustrates the cooling device of the torch and the supply of surfacing powder to it. The portion of the installation not shown is similar to that of FIG. 1.

So far as the cooling device of the torch is concerned, the water supply duct 13 of FIG. 1 corresponds to the duct 213 indicated by dashed lines in FIG. 3.

Between the inlet duct 213 and a corresponding outlet duct 213', three different cooling circuits of the torch, i.e. the cathode cooling circuit 2131-2131', the anode cooling circuit 2132-2132', and the protection nozzle cooling circuit 2133-2133', are connected by means of a distribution device 2141. The distribution device 2141 is diagrammatically indicated by a block formed by dotted lines in FIG. 3 and comprises a plurality of distribution valves which are shown schematically together with their connections which are indicated by solid lines. The distribution lines 2143 to 2146 are controlled by means of a detector 2142 in the duct 2131, arranged to detect the water temperature at the outlet of the cooling device. Such an automatic control can be conventional, and is diagrammatically indicated in FIG. 3 by a connection 2147 between the devices 2142 and 2141.

The diagram of the distribution device 2141 shows that the cathode circuit is always in operation and that each of the cooling circuits can be connected in series or in parallel to the cathode circuit depending on an external control, particularly depending upon the water temperature downstream of the cooling device, or, for example, depending on the electric energy consumed by the torch.

FIG. 3 also diagrammatically shows the supply of powder surfacing material to the torch 201.

The torch 201 has two inlet ducts 210 and 210' for the powder as described with reference to FIG. 2 and these two ducts are supplied as indicated in FIG. 3, by way of a repartition device 2111, by at least two powder distributors 211 and 211' similar to the device 11 of FIG. 1.

The repartition device 2111 and the powder distributors 211, 211' can be manually or automatically controlled, for example depending upon the relative position of the torch and that of the workpiece to be processed in the machine equipped with an installation according to the present invention, so as to supply powder from one and/or the other of the distributors via one and/or the other of the ducts 210, 210' of the torch. In this way, it is possible in particular to obtain a coating of varying composition and depending, as the case may be, on the precise place of its application.

What is claimed is:

1. An installation for surfacing by plasma-arc welding comprising a plasma torch, a source of a plasma-forming gas, a source of protection gas, and a source of gas carrying powder surfacing material, all connected to said torch, a water cooling device for said torch and a control and power supply device for the formation of a transferred arc between the electrode of said torch and the workpiece to be surfaced, and of a non-transferred arc between said electrode and the nozzle of said torch, characterized in that the control and supply device comprises a single d.c. source, one terminal of which is connected to the electrode of said torch and the other terminal of which is connected, on the one hand, to the workpiece to be surfaced and, on the other hand, to said nozzle of said torch via a resistance, said water cooling device having an inlet cooling water duct, and said resistance being located in said inlet cooling water duct of said plasma torch.

2. An installation for surfacing by plasma-arc welding, comprising a plasma torch, a source of a plasma-forming gas, a source of protection gas, and a source of gas-carrying powder surfacing material, all connected to said torch, a water cooling device for said torch and a control and power supply device for the formation of a transferred arc between the electrode of said torch and the workpiece to be surfaced, and of a non-transferred arc between the said electrode and the nozzle of said torch, characterized in that the control and supply device comprises a single d.c. source, one terminal of which is connected to the electrode of said torch, and the other terminal of which is connected, on the one hand, to the workpiece to be surfaced and, on the other hand, to the said nozzle of said torch via a resistance, said control and supply device comprising a striking circuit and a safety device controlled by an apparatus adapted to measure the flow rate of the plasma-forming gas, and by an apparatus adapted to measure the flow rate of cooling water and for controlling said striking circuit of said torch, so that the non-transferred arc is struck only if the two measured flow rates have attained predetermined levels.

3. An installation for surfacing by plasma-arc welding, comprising a plasma torch, a source of a plasma-forming gas, a source of protection gas, and a source of gas-carrying powder surfacing material, all connected to said torch, a water cooling device for said torch and a control and power supply device for the formation of a transferred arc between the electrode of said torch and the workpiece to be surfaced, and of a non-transferred arc between the said electrode and the nozzle of said torch, characterized in that the control and supply device comprises a single d.c. source, one terminal of which is connected to the electrode of said torch and the other terminal of which is connected, on the one hand, to the workpiece to be surfaced and, on the other hand, to the said nozzle of said torch via a resistance, said control and supply device further comprising a welding stop device adapted to cause, upon control of an operator, gradual and simultaneous reduction of the current supplied by the welding current source and of the surfacing material supplied to said torch.

4. An installation as claimed in claim 3, characterized in that it comprises a surfacing powder distributor having an air-tight container formed with an opening circular in cross-section and opening into a carrier gas duct, the said opening having a wedge-shaped closing device which is displaceable with respect to the circular cross-section of the opening.

5. An installation for surfacing by plasma-arc welding, comprising a plasma torch, a source of a plasma-forming gas, a source of protection gas, and a source of gas-carrying powder surfacing material, all connected to said torch, a water cooling device for the torch and a control and power supply device for the formation of a transferred arc between the electrode of said torch and the workpiece to be surfaced, and of a non-transferred arc between the said electrode and the nozzle of said torch, characterized in that the control and supply device comprises a single d.c. source, one terminal of which is connected to the electrode of said torch and the other terminal of which is connected, on the one hand, to the workpiece to be surfaced and, on the other hand, to the said nozzle of said torch via a resistance, said plasma torch having at least two cooling circuits which are supplied by way of a distribution device adapted to connect at least one of said circuits optionally to the cooling device.

6. An installation as claimed in claim 5, characterized in that it comprises a detector adapted to detect the water temperature at the outlet of the cooling device, the detector being connected to the distribution device to control the latter as a function of the detected temperature.

7. The installation as claimed in claim 5 wherein said connection is established in series to said at least another cooling circuit.

8. The installation as claimed in claim 5 wherein said connection is established in parallel to said at least another cooling circuit.

9. An installation as claimed in claim 5 characterized in that said distribution device is adapted to be controlled as a function of the electrical energy consumed by said torch.

10. An installation for surfacing by plasma-arc welding, comprising a plasma torch, a source of a plasma-forming gas, a source of protection gas, and a source of gas-carrying powder surfacing material, all connected to said torch, a water cooling device for said torch and a control and power supply device for the formation of a transferred arc between the electrode of said torch and the workpiece to be surfaced, and of a non-transferred arc between the said electrode and the nozzle of said torch, characterized in that the control and supply device comprises a single d.c. source, one terminal of which is connected to the electrode of said torch and the other terminal of which is connected, on the one hand, to the workpiece to be surfaced and, on the other hand, to the said nozzle of said torch via a resistance, said plasma torch comprising a cathode-holding block, an intermediate insulating member, a fluid-distributing block, an anode assembly, and a protection nozzle, these five components being assembled by screws, said cathode being supported by a screw-threaded part in the middle of said cathode-holding block so that its height can be adjusted from the exterior of said torch by rotating said screw-threaded part, whereby said cathode can be centered in any position thereof with respect to said anode.

11. An installation for surfacing by plasma-arc welding, comprising a plasma torch, a source of a plasma-forming gas, a source of protection gas, and a source of gas-carrying powder surfacing material, all connected to said torch, a water cooling device for said torch and a control and power supply device for the formation of a transferred arc between the electrode of said torch and the workpiece to be surfaced, and of a non-transferred arc between the said electrode and the nozzle of said torch, characterized in that the control and supply device comprises a single d.c. source, one terminal of which is connected to the electrode of said torch, and the other terminal of which is connected, on the one hand, to the workpiece to be surfaced and, on the other hand, to the said nozzle of said torch via a resistance, said plasma torch having at least two surfacing powder inlet ducts supplied by at least two powder distributors by way of a re-partition device to feed respective powders to respective ducts upon an external control.

12. An installation as claimed in claim 11 characterized in that the repartition device is controlled depending on the relative position of said torch and the workpiece to be processed.

13. The installation as claimed in claim 11, characterized in that the powder distributors are controlled depending on the relative position of said torch and the workpiece to be processed.

* * * * *